United States Patent [19]

Kawai et al.

[11] 3,986,006

[45] Oct. 12, 1976

[54] FUEL INJECTION CONTROLLING SYSTEM FOR AN INTERNAL COMBUSTION ENGINE

[75] Inventors: Hisasi Kawai, Toyohashi; Ritsu Katsuoka, Okazaki, both of Japan

[73] Assignee: Nippon Soken, Inc., Nishio, Japan

[22] Filed: Mar. 31, 1975

[21] Appl. No.: 563,445

[30] Foreign Application Priority Data

June 5, 1974 Japan ................................ 49-64454

[52] U.S. Cl. ........................ 235/150.21; 123/32 EA

[51] Int. Cl.[2] .................... G06F 15/20; F02D 33/00

[58] Field of Search ........... 235/150.21; 123/32 EA, 123/119 R

[56] References Cited

UNITED STATES PATENTS

| | | | |
|---|---|---|---|
| 3,727,591 | 4/1973 | Suda | 123/32 EA |
| 3,817,225 | 6/1974 | Priegel | 123/32 EA |
| 3,835,820 | 9/1974 | Fujisawa | 123/32 EA |
| 3,884,195 | 5/1975 | Murtin et al. | 123/32 EA |

*Primary Examiner*—Jerry Smith

*Attorney, Agent, or Firm*—Cushman, Darby & Cushman

[57] ABSTRACT

A fuel injection controlling system for an internal combustion engine comprising an oscillator circuit for generating clock pulses having a frequency corresponding to the air-to-fuel ratio of the mixture, a first detecting circuit for generating pulse signals having a time width corresponding to the rate of air flow to the engine, a first multiplier circuit for generating an output corresponding to the product of the air-to-fuel ratio and the rate of air flow in a binary coded form, a second detecting circuit for generating signals having a pulse width proportional to the rotational speed of the engine, a second multiplier circuit for generating an output corresponding to the product of the air-to-fuel ratio and the rate of air flow and the rotational speed of the engine in a binary coded form, and a conversion circuits for generating pulse signals each corresponding to the output of the second multiplier circuit, whereby fuel injection valves are actuated by the output of the conversion circuit.

5 Claims, 20 Drawing Figures

FUEL INJECTION CONTROLLING SYSTEM FOR AN INTERNAL COMBUSTION ENGINE

BACKGROUND OF THE INVENTION

1. Field of the Invention

The present invention relates to a fuel injection controlling system for an internal combustion engine which digitally computes the quantity of fuel required by the engine.

2. Description of the Prior Art

In the past, fuel injection controlling systems for internal combustion engines have been proposed in which in accordance with the principal engine parameters such as the air flow rate Q, the engine rpm N and the constant K corresponding to the air-to-fuel ratio (A/F) of the mixture, the required fuel quantity $$(K \cdot \frac{Q}{N})$$

of the engine is computed to control the fuel injection quantity. These systems employ an analog computing method and their control units are mainly composed of such elements as capacitors, resistors and transistors. Therefore, these conventional systems are disadvantageous in that the operation of the control unit is fluctuated by variations in a supply voltage and/or changes in ambient temperatures thus necessitating fine adjustments of the various parts of the control unit in accordance with the required characteristic of the engine, and moreover the accuracy of the control unit on the whole is deteriorated by the deterioration of the component elements with age.

SUMMARY OF THE INVENTION

It is the object of the present invention to provide a fuel injection controlling system for an internal combustion engine in which in accordance with the air flow rate Q supplied to the engine, the engine revolution rotational speed N and a constant K corresponding to a predetermined air-to-fuel ratio of the mixture, the required fuel injection quantity K.Q/N is digitally computed, whereby ensuring a stable operation of the system against supply voltage changes and ambient temperature changes and highly accurate controls, making the use of integrated circuits possible and reducing the manufacturing cost of the system.

DESCRIPTION OF THE PREFERRED EMBODIMENT

The present invention will now be described in greater detail with reference to the accompanying drawings. It should be noted that in the illustrated embodiment of the invention extra fuel quantities are added to the fuel injection quantities in accordance with auxiliary parameters of an engine which represent more accurate characteristics of the engine.

Figure 1:
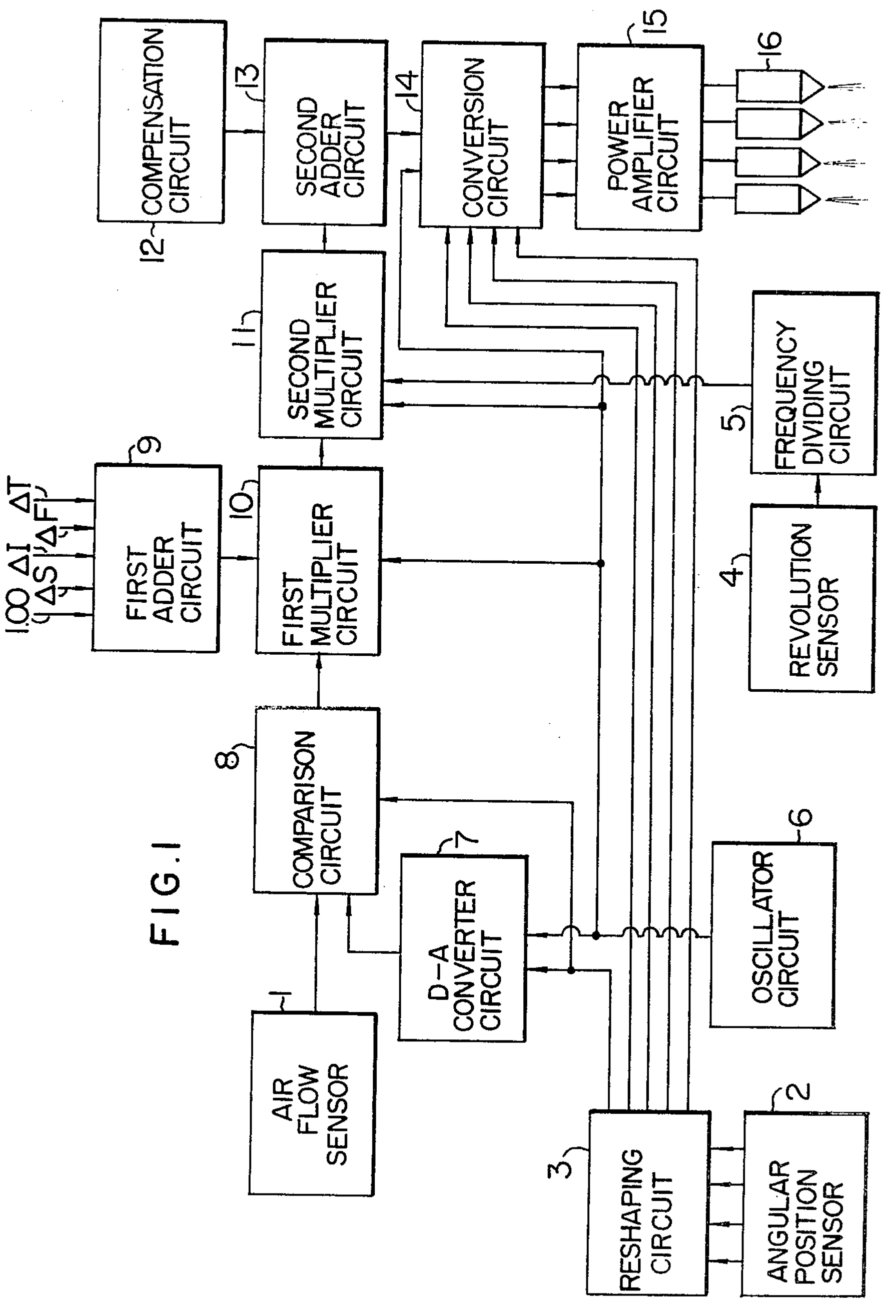
FIG. 1 is a block diagram showing an embodiment of a fuel injection controlling system according to the present invention.

Referring now to FIG. 1 showing the overall construction of an embodiment of a fuel injection controlling system according to the present invention, numeral 1 designates an air flow sensor provided in the intake manifold of a four-cylinder, four-cycle internal combustion engine (not shown) and adapted for generating a voltage proportional to the rate of air flow to the engine which is one of the principal parameters, 2 an angular position sensor for generating one pulse signal for every one-half rotation of the crankshaft at predetermined angular positions, 3 a reshaping circuit for reshaping the waveform of the output pulse signals of the angular position sensor 2, 4 a revolution sensor for generating pulse signals having a frequency proportional to the rotational speed N of the engine which is one of the principal engine parameters, 5 a frequency dividing circuit for dividing the frequency of the pulse signals from the revolution sensor 4 and generating pulse signals having a time width inversely proportional to the rotational speed N, 6 an oscillator circuit for generating clock pulses having a predetermined frequency, 7 a D-A converter circuit adapted to be controlled by the reshaping circuit 3 for generating a sawtooth-wave voltage proportional to the number of clock pulses generated from the oscillator circuit 6 during the period of every one-half rotation of the crankshaft, 8 a comparison circuit for comparing the sawtooth-wave output voltage of the D-A converter circuit 7 with the output voltage of the air flow sensor 1 and generating a pulse signal during the period that the output voltage of the air flow sensor 1 is higher than the voltage at the rise portion of the sawtooth-wave output of the D-A converter circuit 7. Therefore, the pulse signal has a time width proportional to the rate of air flow per one-half rotation of the crankshaft, numeral 9 designates a first adder circuit for performing the operation of binary addition on a constant 1.00 and the auxiliary engine parameters, i.e., the extra fuel quantities such as a starting extra quantity $\Delta S$, an idling extra quantity $\Delta I$, a full throttle extra quantity $\Delta F$ and a low temperature extra quantity $\Delta T$ and generating a binary coded output corresponding to $(1.00 + \Delta S + \Delta I + \Delta F + \Delta T)$, 10 a first multiplier circuit for performing the operation of binary multiplication on the output value of the adder circuit 9 and the output value of the comparison circuit 8 and generating a binary coded output, 11 a second multiplier circuit for performing the operation of binary multiplication on the output value of the first multiplier circuit 10 and the output value of the frequency dividing circuit 5 and generating a binary coded output, 12 a compensation circuit for generating a binary coded output corresponding to a change ΔE in the voltage applied to fuel injection valves 16, 13 a second adder circuit for performing the operation of binary addition on the said voltage change and the output value of the second multiplier circuit 11 and generating a binary coded output, 14 a conversion circuit for converting the output value of the second adder circuit 13 to pulses having a time width corresponding to the period of one-half crankshaft rotation, 15 a power amplifier circuit for amplifying the pulses generated from the conversion circuit 14 for each of the cylinders, 16 a fuel injection valve mounted on each of the cylinders.

In this embodiment, it is assumed that the engine is a four-cylinder, four-cycle engine and the firing order for the cylinder is the first, third, fourth and second cylinders.

The operation of the fuel injection controlling system constructed as described above will now be described briefly. The clock pulses generated from the oscillator circuit 6 during the time period between the pulses generated from the reshaping circuit 3 at intervals of one-half crankshaft rotation are converted by the D-A converter circuit 7 to a sawtooth-wave voltage corresponding to the number of clock pulses generated during the one-half crankshaft rotation. The sawtooth-wave voltage generated from the D-A converter circuit 7 and the voltage generated from the air flow sensor 1 are compared in the comparison circuit 8 thus generating a pulse signal during the period that the output voltage of the air flow sensor 1 is higher than the voltage at the rise portion of the sawtooth-wave output of the D-A converter circuit 7. Therefore, the pulse signal has a time width $T_Q$ proportional to the air flow rate Q. Therefore, the time width $T_Q$ is represented by K.Q, where $K_1$ is a constant.

On the other hand, the first adder circuit 9 performs the operation of binary addition on the auxiliary engine parameters, i.e., the extra quantities ΔS, ΔI, ΔF and ΔT and a constant 1.00, and the operation of binary multiplication is performed by the first multiplier circuit 10 on the binary coded sum of the first adder circuit 9 and the pulse signal generated from the comparison circuit 8 thus generating a binary coded output. The output is represented by $K_1.K_2.Q(1.00 + \Delta S + \Delta I + \Delta F + \Delta T)$, where $K_2$ is a constant. While the process of binary multiplication performed by the first multiplier circuit 10 will be described later, the output of the first adder circuit 9 is added as many times as the number of clock pulses generated from the oscillator circuit 6 during the time width of the pulse signal from the comparison circuit 8 thus generating the binary coded output $K_1.K_2.Q(1.00 + \Delta S + \Delta I + \Delta F + \Delta T)$. On the other hand, the frequency dividing circuit 5 generates the pulse signal the time width $T_N$ of which is inversely proportional to the engine rotational speed N and is represented by $K_3/N$, where $K_3$ is a constant. By adding the output of the first multiplier circuit 10 as many times as the number of clock pulses generated from the oscillator circuit 6 during the time width of the output pulse signal of the frequency dividing circuit 5 the second multiplier circuit 11 generates a binary coded output $K_1.K_2.K_3.K_4.Q(1.00 + \Delta S + \Delta I + \Delta F + \Delta T)/N$, where $K_4$ is a constant. In other words, the output of the second multiplier circuit 11 represents the compensated fuel quantity per cylinder per cycle. And the change ΔE of the voltage applied to the fuel injection valves 16 is converted to a binary code form by the compensation circuit 12 and it is then added to the output of the second multiplier circuit 11 in the second adder circuit 13 by the process of binary addition. The resulting binary coded output $$K_1 \cdot K_2 \cdot K_3 \cdot K_4 \cdot \frac{Q}{N}(1.00 + \Delta S + \Delta I + \Delta F + \Delta T) + \Delta E$$

is converted in the conversion circuit 14 to a pulse signal having a time width TQN corresponding to the binary coded output in synchronism with each of the crankshaft angular positions under the control of the reshaping circuit 3. The time width $T_{QN}$ is represented by $K_5\{K_1.K_2.K_3.K_4.Q(1.00 + \Delta S + \Delta I + \Delta F + \Delta T)/N + \Delta E\}$, where $K_5$ is a constant. These pulse signals are subjected to power amplification and are then used to open the fuel injection valves 16. Setting the oscillator circuit 6 to generate clock pulses whose frequency satisfies $K_1.K_2.K_3.K_4.K_5 = K$ (K: a constant representing the aid-to-fuel ratio, the time width $T_{QN}$ indicates the fuel injection amount.)

While the construction and operation of the fuel injection controlling system according to the invention has been described briefly with reference to FIG. 1, the detailed construction and operation of the component parts of the system will now be described.

Figure 2A:
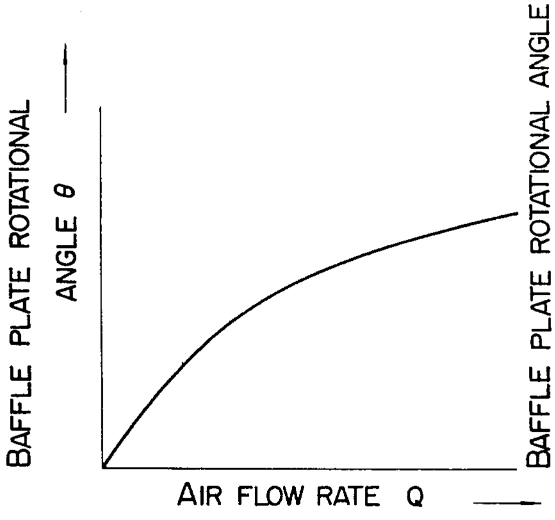
FIGS. 2A, 2B and 2C are characteristic diagrams of the air flow sensor used in the embodiment of FIG. 1.
Figure 2B:
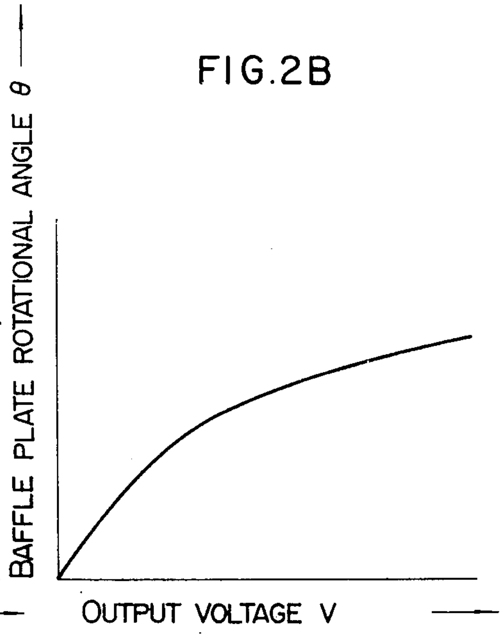
Figure 2C:
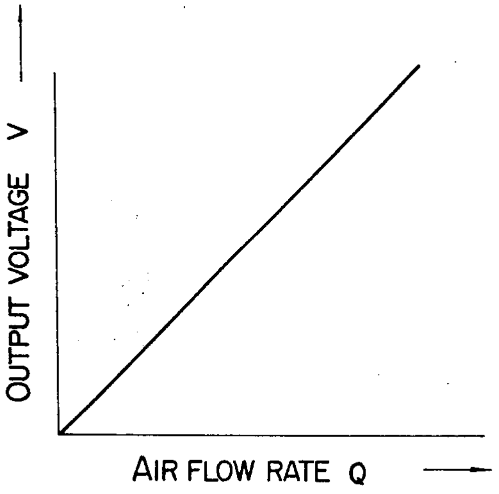

The air flow sensor 1 is of the known baffle plate type, and the value of the rotational angle θ of the baffle plate varies nonlinearly with respect to the air flow rate Q as shown in FIG. 2A. Consequently, the potentiometer of the air flow sensor 1 is designed to show the nonlinear characteristic shown in FIG. 2B with respect to the rotational angle θ of the baffle plate so that the output voltage of the air flow sensor 1 is directly proportional to the rate of air flow to the engine as shown in FIG. 2C.

Figure 3A:
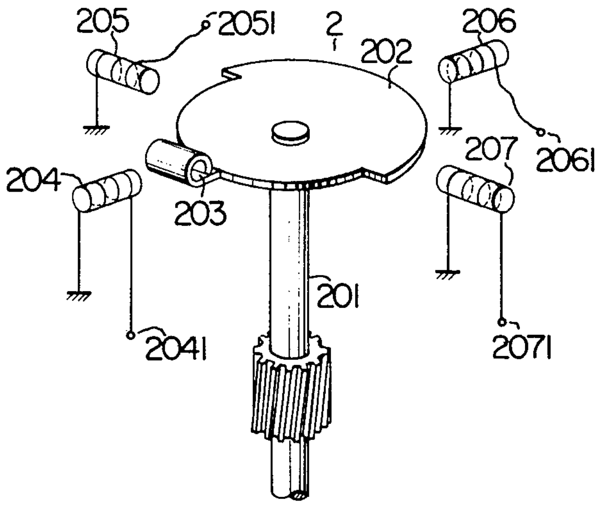
FIGS. 3A and 3B are respectively a schematic diagram of the angular position sensor used in the embodiment of FIG. 1 and its output signal waveform diagram.
Figure 3B:
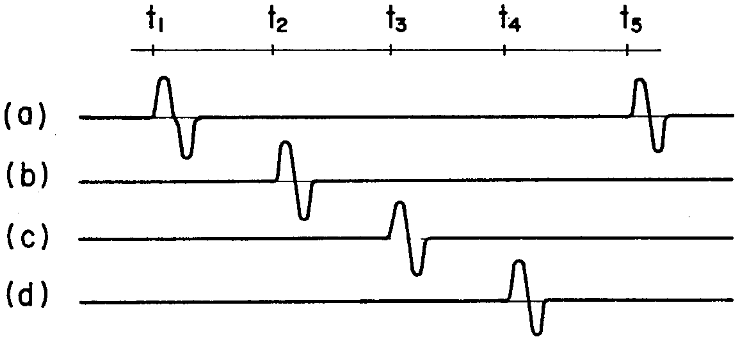

The angular position sensor 2 comprises, as shown in FIG. 3A, a disk 202 made of a non-magnetic material and mounted on a rotor shaft 201 of a distributor (not shown) and a permanent magnet 203 attached to a portion of the disk 202. On the other hand, four wound cores 204, 205, 206 and 207 are arranged along the outer periphery of the disk 202 at equal intervals and in the same plane, so that when the permanent magnet 203 passes the respective wound cores in accordance with the rotation of the rotor shaft 201 which rotates once for every two complete rotations of the crankshaft, the magnetic field in the respective wound cores changes so that the voltages shown by the waveforms (*a*), (*b*), (*c*) and (*d*) of FIG. 3B are induced at one ends 2041, 2051, 2061 and 2071 of the coils of the respective cores which are grounded at the other ends thereof. In this case, times $t_1$, $t_2$, $t_3$, $t_4$ and $t_5$ at which this voltage is induced are selected to coincide with the fuel injection starting times of the engine.

Figure 4A:
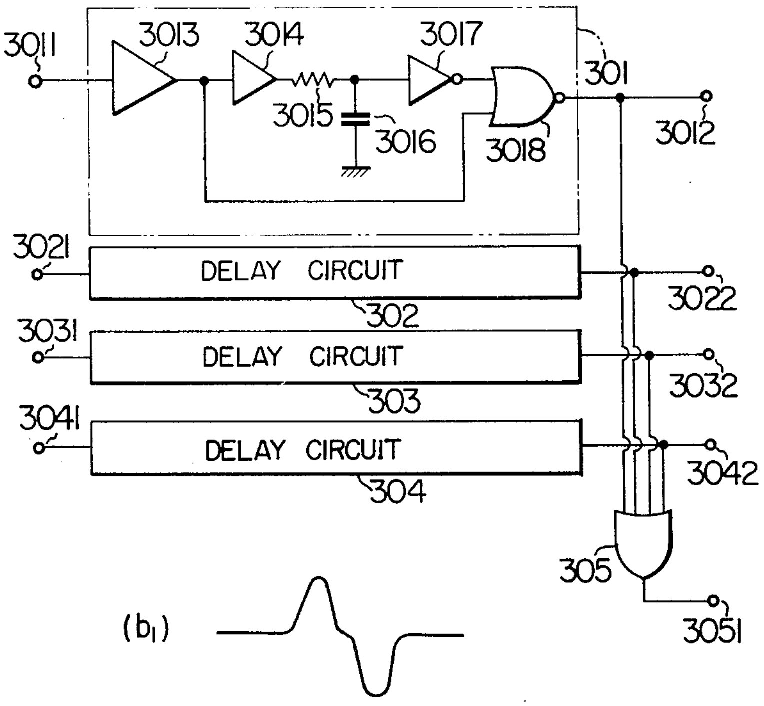
FIGS. 4A, 4B and 4C are respectively a circuit diagram of the reshaping circuit used in the embodiment of FIG. 1 and its output signal waveform diagrams.
Figure 4B:
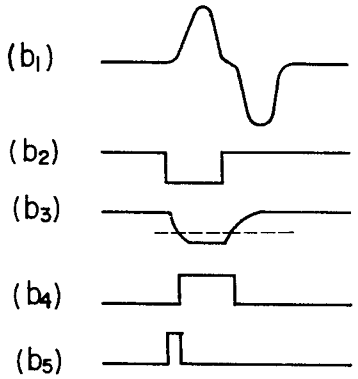
Figure 4C:
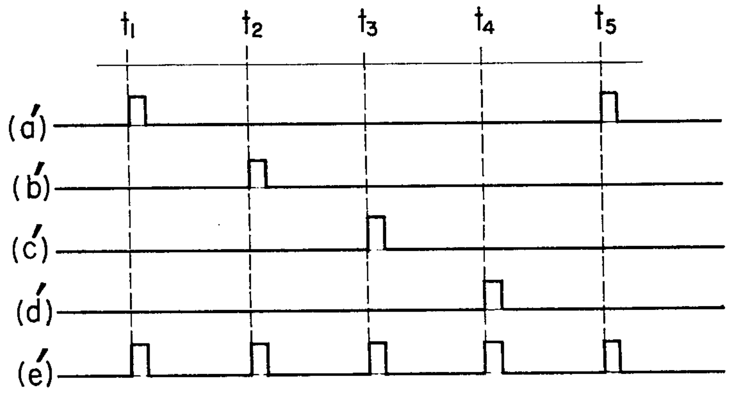

As shown in FIG. 4A, the reshaping circuit 3 comprises logical delay circuits 301, 302, 303 and 304 of the same construction and an OR gate 305. By way of example, the construction of the logical delay circuit 301 will be described in which numeral 3013 designates a comparator which also performs the function of DC amplification (such as the Motorola IC 3302P),

3014 a buffer circuit having its input connected to the output of the comparator 3013 and its output connected to one end of a resistor 3015. The other end of the resistor 3015 is connected to one end of a capacitor 3016 and to the input of an inverter 3017. The other end of the capacitor 3016 is grounded. One of the two inputs of a NOR gate 3018 is connected to the output of the inverter 3017 and the other input is connected to the output of the comparator 3013. While the operation of the logical delay circuit 301 is well known to those skilled in the art and therefore it will not be described in any detail, in FIG. 4B the waveform $(b_1)$ is the pulse signal generated from the angular position sensor 2 and the application of this pulse signal to an input 3011 of the comparator 3013 results in the signals shown by the waveforms $(b_2)$, $(b_3)$, $(b_4)$ and $(b_5)$ of FIG. 4B which are respectively generated at the output of the comparator 3013, the input of the inverter 3017, the output of the inverter 3017 and the output of the NOR gate 3018. The other logical delay circuit 302, 303 and 304 operate in a similar manner so that when the pulse signals (*a*), (*b*), (*c*) and (*d*) shown in FIG. 3A are applied respectively to the input terminals 3011, 3021, 3031 and 3041, the pulse signals shown by the waveforms $(a')$, $(b')$, $(c')$ and $(d')$ of FIG. 4C are respectively generated at output terminals 3012, 3022, 3032 and 3042. The four-input OR gate 305 connected to the output terminals 3012, 3022, 3032 and 3042 generates the pulse signals shown by the waveform (*e*) of FIG. 4C.

Although the revolution sensor 4 is not shown in any detail, it is of the known type in which the electromagnetic pickup generates pulses in accordance with the rotation of the ring gear of the engine. Assuming that the number of teeth in the ring gear is 115 and the rotational speed of the engine is N (rpm), the period T of the pulses generated from the revolution sensor 4 is given by the following equation $$T = \frac{1}{\frac{115 \cdot N}{60}} = \frac{12}{23 \cdot N}$$

In other words, the period *T* is inversely proportional to the rotational speed *N*.

Figure 5A:
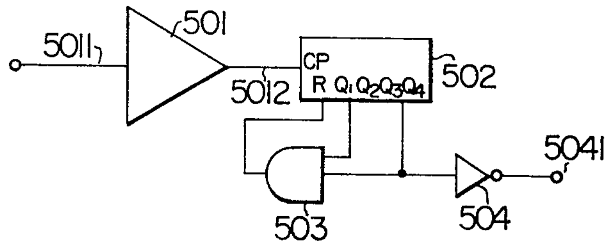
FIGS. 5A and 5B are respectively a circuit diagram of the frequency dividing circuit used in the embodiment of FIG. 1 and its output signal waveform diagram.
Figure 5B:
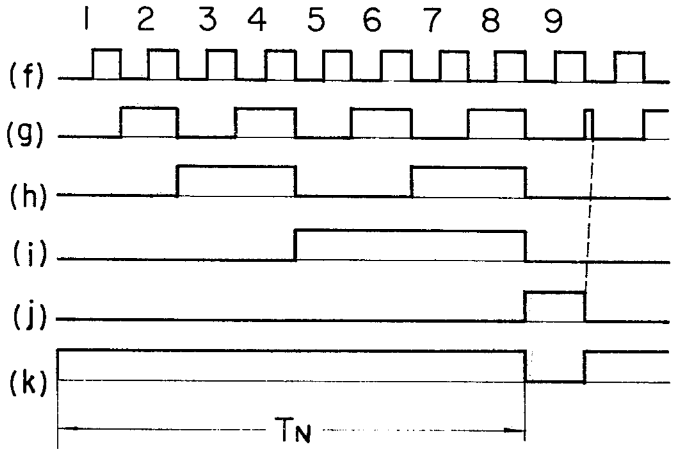

The frequency dividing circuit 5 comprises, as shown in FIG. 5A, a DC amplifier 501 (such as the Motorola IC MC 3302P) having its input terminal 5011 connected to the revolution sensor 4 which is not shown, a binary counter 502, and an AND gate 503 and an inverter 504. In the binary counter 502, symbol R designates a reset terminal, and $Q_1$, $Q_2$, $Q_3$ and $Q_4$ designate the output terminals for respectively delivering the rectangular pulses produced by dividing the input frequency by factors 2, 4, 8 and 16, respectively. The pulses having the period T which is inversely proportional to the rotational speed N as mentioned earlier are amplified and reshaped by the DC amplifier 501. The DC amplifier 501 generates at its output terminal 5012 the rectangular pulses shown by the waveform (*f*) of FIG. 5B, and the rectangular pulses are then frequency-divided by the binary counter 502 which respectively generates at its output terminals $Q_1$, $Q_2$, $Q_3$ and $Q_4$ the pulse signals respectively shown by the waveforms (*g*), (*h*), (*i*) and (*j*). When the output terminals $Q_1$ and $Q_4$ go simultaneously to a high level (hereinafter simply referred to as a logical signal 1), the AND gate 503 generates a 1 and the binary counter 502 is reset thus causing all of the output terminals $Q_1$, $Q_2$, $Q_3$ and $Q_4$ to go to a low level (hereinafter simply referred to as a 0). Consequently, the signal generated at the output terminal $Q_4$ and inverted by the inverter 504 is generated at its output terminal 5041 as shown by the waveform (*k*) of FIG. 5B, and its time width $T_1$ representing the 1 state corresponds to a group of 8 rectangular pulses shown by the waveform (*f*) of FIG. 5B and is inversely proportional to the engine rotation speed N as given by the following equation $$T = 8T = \frac{96}{23 \cdot N} = \frac{K_3}{N} (K_3\text{: a constant})$$

Figure 6A:
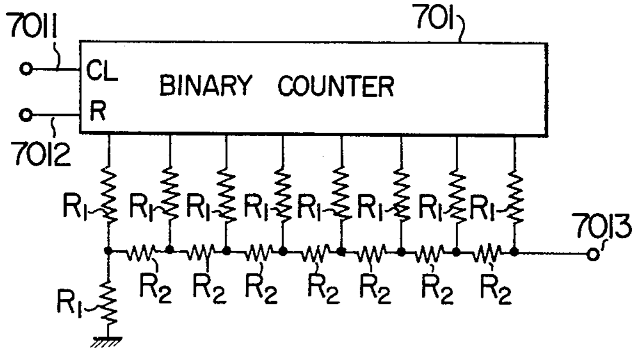
FIGS. 6A and 6B are respectively a circuit diagram of the D-A converter circuit used in the embodiment of FIG. 1 and its output signal waveform diagram.
Figure 6B:
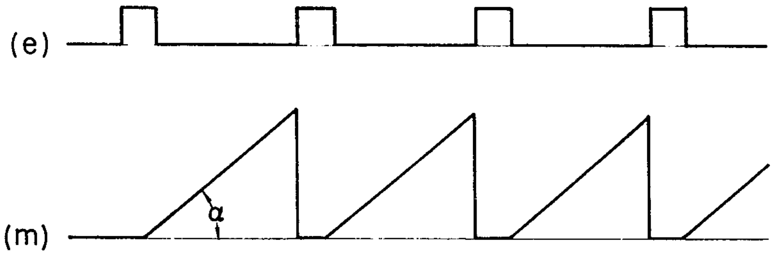

Although the construction of the oscillator circuit 6 is not shown, it may for example be a known type of crystal resonator. The oscillator circuit 6 generates clock pulses, the frequency thereof being predetermined in accordance with the air-to-fuel ratio. As shown in FIG. 6A, the D-A converter circuit 7 comprises an 8-bit binary counter 701 and a ladder type resistor network including resistors having a resistance value $R_1$ or $R_2$. The binary counter 701 has its input terminal 7011 connected as a clock terminal to the oscillator circuit 6 and its reset terminal 7012 connected to the output terminal 3051 of the reshaping circuit 3, and numeral 7013 designates the output terminal of the D-A converter circuit 7. The D-A converter circuit 7 is designed so that each time a 1 is generated by the OR gate 305 of the reshaping circuit 3, the binary counter 701 is reset to count the clock pulses generated from the oscillator circuit 6. Consequently, the sawtooth waveform shown in FIG. 6B (*m*) is generated at the output terminal 7013. The waveform shown in FIG. 6B (*e*) is the same as the waveform shown in FIG. 4C (*e*). An inclination $\alpha$ of the sawtooth waveform shown in FIG. 6B (m) corresponds to the oscillation frequency of the oscillator circuit 6.

Figure 7A:
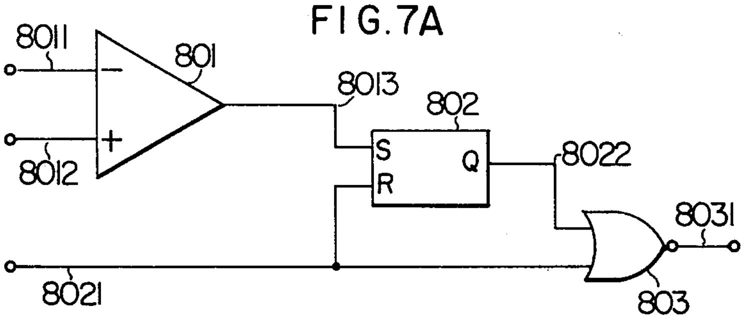
FIGS. 7A and 7B are respectively a circuit diagram of the comparison circuit used in the embodiment of FIG. 1 and its output signal waveform diagram.
Figure 7B:
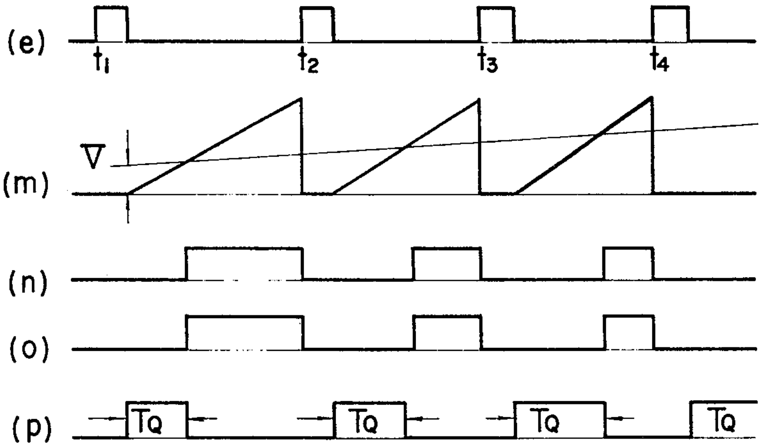

The comparison circuit 8 comprises, as shown in FIG. 7A, a comparator 801, an R-S flip-flop 802 and a NOR gate 803, and the comparator 801 has its inverting input terminal 8011 connected to the air flow sensor 1 and its noninverting input terminal 8012 to the output terminal 7013 of the D-A converter circuit 7. The R-S flip-flop 802 has its set terminal S connected to the output terminal of the comparator 801 and its reset terminal R connected to one input terminal 8021 of the NOR gate 803 and the output terminal 3051 of the reshaping circuit 3. The other input terminal of the NOR gate 803 is connected to the R-S flip-flop 802. Consequently, when the reshaping circuit 3 generates at its output terminal 3051 the 1 (FIGS. 4C(*e*), 6B(*e*) and 7B(*e*)) at each of the times $t_1$, $t_2$, $t_3$ and $t_4$ for every one-half rotation of the crankshaft, the R-S flip-flop 802 is reset and a 0 is generated at its Q output terminal 8022. And the comparator 801 generates the 1 at the output terminal 8013 as shown in FIG. 7B(*n*) when the output voltage V of the air flow sensor 1 becomes lower than the sawtooth-wave voltage at the output terminal 7013 of the D-A converter circuit 7. When the sawtooth-wave voltage shown in FIG. 7B(*m*) (FIG. 6B(*m*)) becomes lower than the output voltage V of the air flow sensor 1, the output terminal 8013 again goes to 0.When the output terminal 8013 of the comparator 801 goes to 1, the R-S flip-flop 802 is set and its Q output terminal 8022 goes to 1 as shown in FIG. 7B(*o*).

While the waveform shown in FIG. 7B($n$) is the same with that shown in FIG. 7B($o$), this results from the fact that the R-S flip-flop 802 is employed in such a manner that the Q output of the R-S flip-flop 802 is prevented from chattering even when the baffle plate of the air flow sensor 1 chatters thus causing the voltage V shown in FIG. 7B($m$) to change abruptly. The NOR gate 803 receives as its inputs the output of the reshaping circuit 3 and the output of the R-S flip-flop 802 and generates at its output terminal 8031 a signal having a time width $T_Q$ proportional to the air flow rate Q and is represented by $K_1.Q$, where $K_1$ is a constant.

Figure 8:
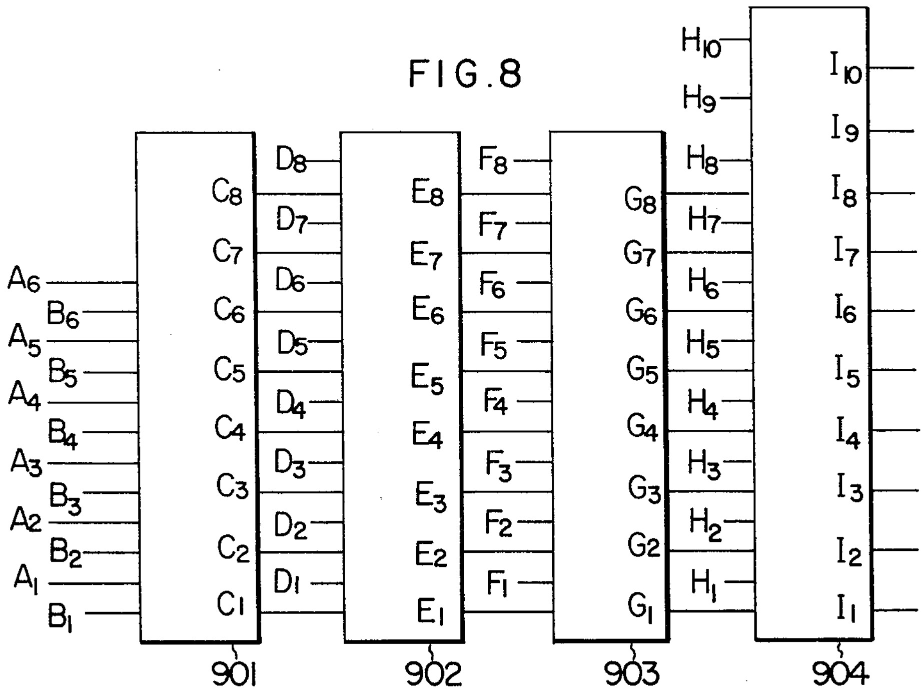
FIG. 8 is a circuit diagram of the first adder circuit used in the embodiment of FIG. 1.

The first adder circuit 9 comprises, as shown in FIG. 8, parallel binary adders 901, 902, 903 and 904 (such as the RCA IC CD4008) which are connected in cascade. In FIG. 8, the letters added to the respective adders indicate the binary positions. For example, letter $A_6$ represents the sixth binary position. In this embodiment, $A_6$ $A_5$ $A_4$ $A_3$ $A_2$ $A_1$ constitute a binary code which represents the full throttle extra quantity ΔF only when the throttle valve is fully opened, while $B_6$ $B_5$ $B_4$ $B_3$ $B_2$ $B_1$ constitute a binary code which represents the starting extra quantity ΔS only during the starting period of the engine, and the adder 901 computes ΔF + ΔS and delivers the resulting sum as a binary code $C_8$ $C_7$ $C_6$ $C_5$ $C_4$ $C_3$ $C_2$ $C_1$. On the other hand, $D_8$ $D_7$ $D_6$ $D_5$ $D_4$ $D_3$ $D_2$ $D_1$ constitute a binary code which represents the idling extra quantity ΔI and it is applied to the inputs of the parallel adder 902 along with the output $C_8$ $C_7$ $C_6$ $C_5$ $C_4$ $C_3$ $C_2$ $C_1$ generated from the parallel adder 901 thus delivering the resulting sum ($E_8$ $E_7$ $E_6$ $E_5$ $E_4$ $E_3$ $E_2$ $E_1$). $F_8$ $F_7$ $F_6$ $F_5$ $F_4$ $F_3$ $F_2$ $F_1$ constitute a binary code which always represents the value corresponding to 1.00, and it is applied to the parallel adder 903 along with the output $E_8$ $E_7$ $E_6$ $E_5$ $E_4$ $E_3$ $E_2$ $E_1$ generated from the parallel adder 902 so that the resulting sum $G_8$ $G_7$ $G_6$ $G_5$ $G_4$ $G_3$ $G_2$ $G_1$ is obtained from the parallel adder 903. $H_{10}$ $H_9$ $H_8$ $H_7$ $H_6$ $H_5$ $H_4$ $H_3$ $H_2$ $H_1$ constitute a binary code which represents the low temperature extra quantity ΔT and it is applied to the parallel adder 904 along with the output $G_8$ $G_7$ $G_6$ $G_5$ $G_4$ $G_3$ $G_2$ $G_1$ generated from the parallel adder 903. The parallel adder 904 in turn generates the resulting sum $I_9$ $I_8$ $I_7$ $I_6$ $I_5$ $I_4$ $I_3$ $I_2$ $I_1$. In this way, the output $I_{10}$ $I_9$ $I_8$ $I_7$ $I_6$ $I_5$ $I_4$ $I_3$ $I_2$ $I_1$ from the adder circuit 9 represents the result of the operation of addition $A_6$ $A_5$ $A_4$ $A_3$ $A_2$ $A_1$ + $B_6$ $B_5$ $B_4$ $B_3$ $B_2$ $B_1$ + $D_8$ $D_7$ $D_6$ $D_5$ $D_4$ $D_3$ $D_2$ $D_1$ + $F_8$ $F_7$ $F_6$ $F_5$ $F_4$ $F_3$ $F_2$ $F_1$ + $H_{10}$ $H_9$ $H_8$ $H_7$ $H_6$ $H_5$ $H_4$ $H_3$ $H_2$ $H_1$, and the output binary code $I_{10}$ $I_9$ $I_8$ $I_7$ $I_6$ $I_5$ $I_4$ $I_3$ $I_2$ $I_1$ from the adder circuit 9 represents the result of the operation of binary addition on the full throttle extra quantity ΔF, the starting extra quantity ΔS, the idling extra quantity ΔI, the low temperature extra quantity ΔT and the constant 1.00 (ΔF + ΔS + ΔI + ΔT + 1.00). In this embodiment, the respective extra quantities are preset in accordance with the characteristic of an engine. Consequently, to obtain the full throttle extra quantity $\Delta F = 0.2$, it may for example be arranged so that $H_{10}$ $H_9$ $H_8$ $H_7$ $H_6$ $H_5$ $H_4$ $H_3$ $H_2$ $H_1$ = 0001100100 and $A_6$ $A_5$ $A_4$ $A_3$ $A_2$ $A_1$ = 010100. On the other hand, to obtain $A_6$ $A_5$ $A_4$ $A_3$ $A_2$ $A_1$ = 010100 only when the throttle valve is opened fully, though not shown, terminals $A_6$, $A_4$, $A_2$ and $A_1$ of the parallel adder 901 will always be grounded and only its terminals $A_5$ and $A_3$ will be changed from the ground potential to the high level potential 1 state under the wide open throttle condition. The other extra quantities ΔS and ΔI may be determined in a like manner as the full throttle extra quantity ΔF, and the value of the low temperature extra quantity ΔT is increased as the temperature of the engine cooling water decreases although no detailed arrangement for this purpose is illustrated.

Figure 9B:
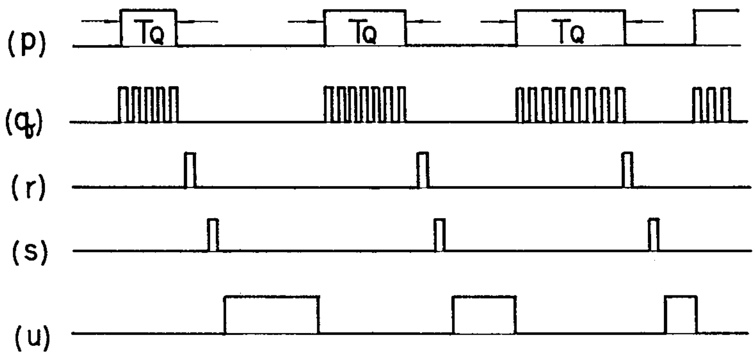
FIGS. 9A and 9B are respectively a circuit diagram of the first multiplier circuit used in the embodiment of FIG. 1 and its output signal waveform diagram.
Figure 9A:
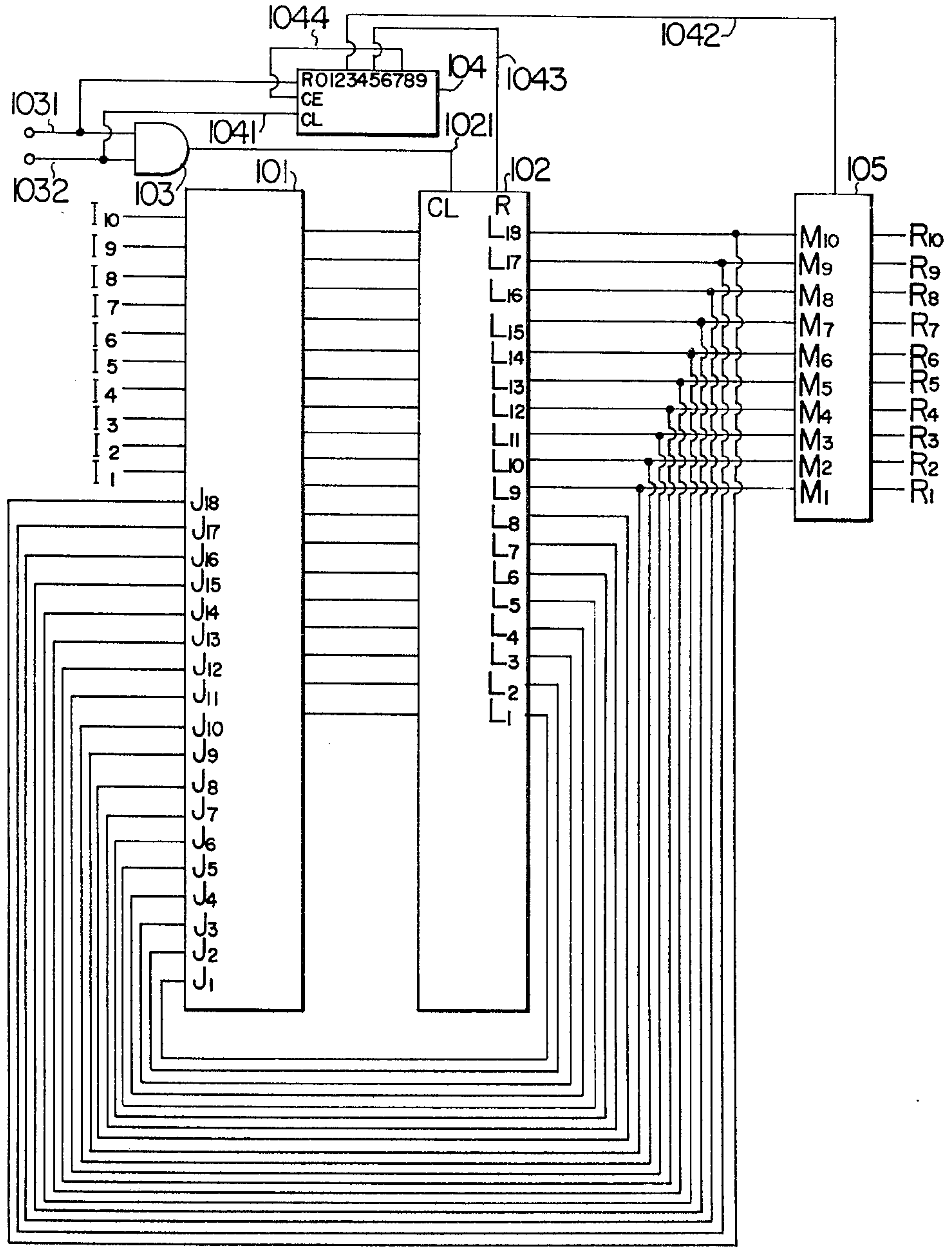

The circuit construction of the first multiplier circuit 10 is shown in FIG. 9A, in which numeral 101 designates an adder (such as the RCA IC CD4008) for adding two 18-bit inputs together and generating an 8-bit output, and the adder 101 is connected to the inputs of a memory (such as the RCA IC CD4035) whose outputs L's are connected to one inputs J's of the adder 101, and the other inputs I's of the adder 101 are connected to the outputs of the adder circuit 9. In this embodiment, the adder circuit 9 generates a 10-bit output and therefore the eleventh to eighteenth inputs I's of the adder 101 are 0 inputs although they are not shown. The first multiplier circuit 10 further comprises, in addition to the adder 101 and the memory 102, an AND gate 103, a decade divider and counter 104 (such as the RCA IC CD4017) for controlling the operation of multiplication and to a memory 105 (such as the RCA IC CD4042) for storing the result of an operation. The output terminal 8031 of the comparison circuit 8 is connected to one gate input 1031 of the two inputs of the AND gate 103 and the oscillator circuit 6 is connected to the other gate input 1032. The output terminal of the AND gate 103 is connected to a clock input terminal 1021 of the memory 102, and the decade divider and counter 104 has its clock input terminal 1041 connected to the input terminal 1032 of the AND gate 103 and its reset input terminal R connected to the input terminal 1031. The decade divider and counter 104 generates a 1 at each of its output terminals 1042, 1043 and 1044 in response to the application thereto of the second clock pulse, the fourth clock pulse and the sixth clock pulse, respectively. The output terminal 1042 of the decade divider and counter 104 is connected to the clock input terminal of the memory 105, the output terminal 1043 is connected to the reset terminal of the memory 102 and the output terminal 1044 is connected to the clock inhibit input terminal (CE) of the decade divider and counter 104. The memory 105 has its inputs $M_{10}$, $M_9$, $M_8$, $M_7$, $M_6$, $M_5$, $M_4$, $M_3$, $M_2$ and $M_1$ respectively connected to the ten higher order outputs $L_{18}$, $L_{17}$, $L_{16}$, $L_{15}$, $L_{14}$, $L_{13}$, $L_{12}$, $L_{11}$, $L_{10}$ and $L_9$ of the outputs $L_{18}$ through $L_1$ of the memory 102, and the memory 105 generates its output as $R_{10}$ $R_9$ $R_8$ $R_7$ $R_6$ $R_5$ $R_4$ $R_3$ $R_2$ $R_1$. During the 1 level of the pulse width $T_Q$ of the output of the comparison circuit 8 which is proportional to the air flow rate and which is shown in FIG. 9B($p$) (the same as FIG. 7B($p$)), the clock pulses from the oscillator circuit 6 are delivered to the output terminal of the AND gate 103. In other words, as shown in FIG. 9B($q$), $n$ clock pulses corresponding to the air flow rate are generated. After the output of the comparison circuit 8 has gone to 0, the clock pulses from the oscillator circuit 6 are counted by the decade divider and counter 104 so that a 1 is generated at each of the output terminals 1042, 1043 and 1044 in response to the counting of the second, fourth and sixth clock pulses, respectively, as shown in FIGS. 9B($r$), 9B($s$) and 9B($u$). When this occurs, the 1 shown in FIG. 9B($s$) resets the memory 102 thus clearing its outputs $L_{18}$, $L_{17}$ . . . $L_1$ to 0, 0 . . . 0. Then, the memory 102 generates an output $I_{10}$ . . . $I_1$ in response to the application of the first one of the clock pulses shown in FIG. 9B($q$), and the memory 102 generates an output 2 × $I_{10}$ . . . $I_1$ in response to the application of the second clock pulse. Consequently, the application of $n$ clock pulses to the memory 102 causes it to generate an output whose value is $n \times I_{10} \ldots I_1$. In this case, the number $n$ of the clock pulse is proportional to the value $K_1.Q$, and therefore it can be represented by $K_1.K_2.Q$($K_2$: a constant). Thus, the output $I_{10} \ldots I_1$ represents the value $(1.00 + \Delta S + \Delta F + \Delta I + \Delta T)$, this means that a multiplication $K.Q(1.00 + \Delta S + \Delta F + \Delta I + \Delta T)$ has been performed. The higher ten digits of the resulting binary coded product are stored in the memory 105 in response to the 1 shown in FIG. 9B($r$). Now considering from the accuracy point of view, since the value $(1.00 + \Delta S + \Delta F + \Delta I + \Delta T)$ involves 10 digits in binary form and the value $K_1.K_2.Q$ similarly involves eight digits in binary form, the use of the 10 digits in the output of the first multiplier circuit 10 results in the same error rate for both the input and the output in consideration of the number of significant digits. Consequently, the memory 105 stores the higher 10 digits in the output of the memory 102. The second multiplier circuit 11 is identical in circuit construction with the first multiplier circuit 10 described with reference to FIG. 9A except that the number of digital positions in the input and output are increased and therefore its circuit construction is not shown. The output $R_{10} \ldots R_1$ of the first multiplier circuit 10 is applied to the second multiplier circuit 11 as its input. And, in place of the pulses for the first multiplier circuit 10 which are proportional to the air flow rate, the pulse (FIG. 5B($k$)) generated at the output terminal 5041 of the frequency dividing circuit 5 and having the time width inversely proportional to the engine revolutions is applied to the second multiplier circuit 11 which in turn generates a 10-bit binary code $X_{10} \ldots X_1$ corresponding to $$\frac{1}{N} K_1 \cdot K_2 \cdot K_3 \cdot K_4 \cdot Q\ (1.00 + \Delta S + \Delta F + \Delta I + \Delta T),$$

where $K_4$ is a constant. The constant $K_4$ is introduced in the same manner as the constant $K_2$ in the first multiplier circuit 10.

Figure 10:
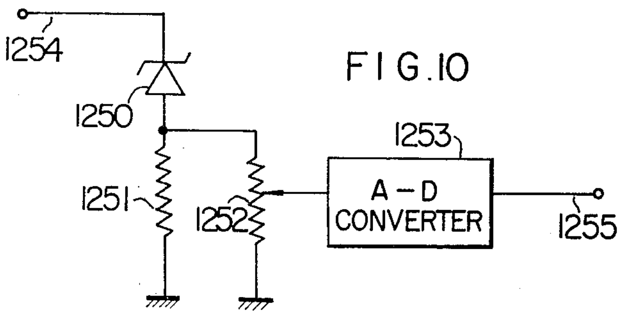
FIG. 10 is a circuit diagram of the correction circuit used in the embodiment of FIG. 1.

The compensation circuit 12 is designed so that compensation is made for changes in the voltage applied to the electromagnetic coil of the fuel injection valves. The circuit construction of the compensation circuit 12 is illustrated in FIG. 10. In FIG. 10, numeral 1250 designates a Zener diode whose anode is grounded through a resistor 1251 and an input terminal 1254 (the cathode side) is connected to the positive side of the electromagnetic coil of the fuel injection valves which are not shown. Numeral 1252 designates a variable resistor whose one end is grounded. The variable terminal of the variable resistor 1252 is connected to the input terminal of a conventional A–D converter 1253. Numeral 1255 designates the output terminal of the A-D converter 1253.

In the arrangement described above, if the voltage to be applied to the electromagnetic coils is set to 10 volts, the Zener voltage is selected 10 volts. When the applied voltage exceeds 10 volts, the voltage at the anode of the Zener diode 1250 increases in accordance with the applied voltage. In other words, when the applied voltage is 10 volts the anode of the Zener diode 1250 is 0 volt, whereas when the former is 11 volts and 16 volts, respectively, the latter is 1 volt and 6 volts, respectively. The variable resistor 1252 adjusts the voltage range of 0 to 6 volts to a gradient of 0 to 1 volt, 0 to 3 volts or the like, and the A-D converter 1253 converts the voltage at the variable terminal of the variable resistor 1252 into a binary code by the process of analog-to-digital conversion.

Figure 11:
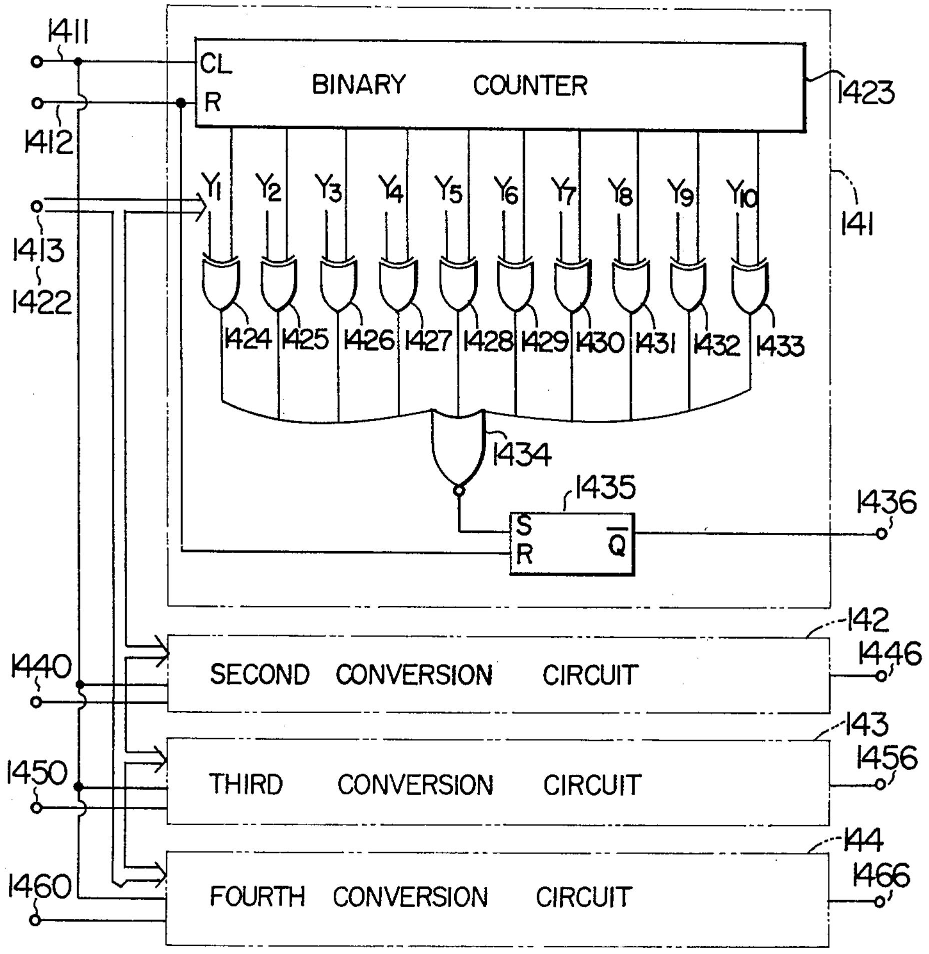
FIG. 11 is a circuit diagram of the conversion circuit used in the embodiment of FIG. 1.

The second adder circuit 13 adds in parallel the binary coded output $X_{10} X_9 \ldots X_1$ of the second multiplier circuit 11 and the binary coded output of the compensation circuit 12, and it will not be described in any detail since the required function can be performed with a single parallel adder of a known type (such as the RCA IC CD4008). In this embodiment, the output of the second adder circuit 13 is assumed $Y_{10} Y_9 \ldots Y_1$. As shown in FIG. 11, the conversion circuit 14 comprises first, second, third and fourth conversion circuits 141, 142, 143 and 144. The first conversion circuit 141 comprises a 10-bit binary counter 1423, EXCLUSIVE OR gates 1424, 1425, 1426, 1427, 1428, 1429, 1430, 1431, 1432 and 1433, a 10-input NOR gate 1434 and an R-S flip-flop 1435. The binary counter 1423 has its clock input terminal 1411 connected to the oscillator circuit 6 and its reset terminal 1412 connected to the output terminal 3012 of the reshaping circuit 3. The respective output terminals of the counter 1423 are connected to one input terminals of the associated EXCLUSIVE OR gates, and the other input terminals of the EXCLUSIVE OR gates are respectively connected to the outputs $Y_{10} \ldots Y_1$ of the second adder circuit 13. The outputs of the EXCLUSIVE OR gates are connected to the input terminals of the 10-input NOR gate 1434. The output terminal of the NOR gate 1434 is connected to the set terminal of the R-S flip-flop 1435. The reset terminal of the R-S flip-flop 1435 is connected to the reset terminal 1412 of the binary counter 1423. Numeral 1436 designates an output terminal. In operation, the pulse shown in FIG. 4C($e$) is applied to the reset terminal 1412 thus resetting the binary counter 1423 and the R-S flip-flop 1435. At the instant that this occurs, the binary counter 1423 starts to count the clock pulses of the predetermined frequency which are generated from the oscillator circuit 6, so that when all the outputs of the counter 1423 coincide with the inputs $Y_{10} \ldots Y_1$ (the output of the adder circuit 13), the NOR gate 1434 generates a 1 thus setting the R-S flip-flop 1435 and causing the output terminal 1436 to go from 1 to 0. The time interval between the resetting and setting of the R-S flip-flop 1435, that is, the time duration during which the 1 remains or at the output terminal 1436 is proportional to the input $Y_{10} \ldots Y_1$ representing $K_1.K_2.K_3.K_4.Q(1.00 + \Delta S + \Delta F + \Delta I + \Delta T + \Delta E$. Therefore, the converted time width $T_{QN}$ can be represented by $K_5\{K_1.K_2.K_3.K_4.Q(1.00 + \Delta S + \Delta F + \Delta I + \Delta T) + \Delta E\}$, where $K_5$ is a constant.

On the other hand, while no detailed description of the second third and fourth conversion circuit 142, 143 and 144 will be made since they are identical in circuit construction and function with the first conversion circuit 141, input terminals 1440, 1450 and 1460 which are respectively connected to the binary counter and the R-S flip-flop of the second, third and for fourth conversion circuits 142, 143 and 144 are respectively connected to the output terminals 3042, 3022 and 3032 of the reshaping circuit 3. As a result, the pulse signals are generated in synchronism with the angular positions of the crankshaft in the sequence of the first, third, fourth and second conversion circuits 141, 143, 144 and 142.

The power amplifier circuit 15 is also of a known type. Though the circuit construction of the power amplifier circuit 15 is not shown, it may for example be designed so that when a 1 is generated at each of the output terminals 1436, 1446, 1456 and 1466 of the conversion circuit 14, a transistor is rendered conductive to energize the excitation coil of the fuel injection valve 16 mounted on each cylinder. It is a matter of course that the fuel injection valves 16 provided for the first, second, third and fourth cylinders of the engine are respectively associated with the first, second, third and fourth conversion circuits 141, 142, 143 and 144, and the proper amount of fuel determined in the manner described so far is injected into the engine in the sequence of the first, third, fourth and second cylinders.

It should be noted that the above-mentioned binary multiplication process of multiplying the number of clock pulses proportional to the time width proportional to the air flow rate Q by the number of clock pulses proportional to the time width proportional to the reciprocal (1/N) of the engine rotational speed results in a simpler circuit construction than that of the conventional method in which the multiplier and multiplicand are stored in the respective registers and the operation of multiplication is accomplished by means of an adder circuit and a shift control circuit, and the operation time is also shorter than that of the conventional method.

While the detailed construction and operation of the preferred embodiment of the present invention has been described so far, if, in FIG. 1, the conversion ratios of output to input in the comparison circuit 8, the first multiplier circuit 10, the frequency dividing circuit 5, the second multiplier circuit 11, and the conversion circuit 14 are designated as $K_1$, $K_2$, $K_3$, $K_4$ and $K_5$, respectively, then the output of the conversion circuit 14 is given by the following equation $$\{K_1 \cdot K_2 \cdot K_3 \cdot K_4 \cdot \frac{Q}{N}(1.00 + \Delta S + \Delta F + \Delta I + \Delta T) + \Delta E\} \cdot K_5 = K \cdot \frac{Q}{N}(1.00 + \Delta S + \Delta F + \Delta I + \Delta T) + \Delta E \cdot K_5;$$

where $K = K_1.K_2.K_3.K_4.K_5$ .

In this expression the constant K can represent the air-to-fuel ratio of the mixture by appropriately determining the oscillation frequency of the oscillator circuit 6, because the constants $K_1$, $K_2$, $K_4$ and $K_5$ depend on the oscillation frequency.

To obtain the same results as described above, the oscillation frequency may be determined so that $K = K_1.K_2$ is satisfied, with the constant $K_3$ independent of the oscillation frequency being determined to satisfy $K_3 = 1/(K_4.K_5)$.

Otherwise, the constant K may be multiplied on $(1.00 + \Delta S + \Delta F + \Delta I + \Delta T)$, with the constant $K_3$ being determined to satisfy $K_3 = 1/(K_1.K_2.K_4.K_5)$.

Further, while, in the above-described embodiment, the number of operations in the multiplier circuit 11 is increased as compared with that of the multiplier circuit 10 so as to cause the fuel injection quantity to accurately follow the variation in the engine revolutions, the number of teeth in the ring gear constituting the revolution sensor 4 may be selected to ensure a 1 : 1 ratio in the number of operations between the multiplier circuits 10 and 11.

What is claimed is:

1. In a fuel injection controlling system for an internal combustion engine in which a fuel injection quantity K.Q/N is computed in accordance with an air flow rate Q, an engine rpm N and a constant K corresponding to the air-to-fuel ratio of a mixture, which rate Q, rpm N and constant K constitute principal parameters of said engine, the improvement comprising:

an oscillator circuit for generating clock pulses having a predetermined frequency;

first sensing means for generating a pulse signal having a time width proportional to said air flow rate Q;

a first multiplier circuit connected to said oscillator circuit and said first sensing means for repeatedly adding a predetermined binary coded value in response to said clock pulses, the number of times of the addition in said first multiplier circuit being controlled by said pulse signal from said first sensing means, and for generating a binary coded output signal proportional to the air flow rate Q;

second sensing means for generating a pulse signal having a time width proportional to the reciprocal 1/N of said engine rpm N;

a second multiplier circuit connected to said second sensing means, said oscillator circuit and said first multiplier circuit, for repeatedly adding said binary coded output from said first multiplier circuit in response to said clock pulses, the number of times of the addition in said second multiplier circuit being controlled by the pulse signal from said second sensing means, and for generating a binary coded output signal proportional to a product $$Q \cdot \frac{1}{N};$$

third sensing means connected to a crankshaft of said engine for generating a pulse signal at specific angular positions of said crankshaft; and a conversion circuit connected to said second and said third sensing means, for generating, in synchronism with said pulse signals from said third sensing means, a pulse signal having a time width proportional to said binary coded output signal of said second multiplier circuit and indicative of fuel injection amount.

2. A fuel injection controlling system according to claim 1, wherein said first sensing means include an air flow sensor for generating a voltage proportional to the rate of air flow to said engine, a D-A converter circuit connected to said oscillator circuit and said third sensing means for converting the clock pulses from said oscillator circuit to a voltage each time said pulse signal from said third sensing means is applied thereto, and a comparison circuit connected to said air flow sensor and said D-A converter circuit for comparing said voltages and generating a pulse signal having a time width proportional to the rate of air flow to said engine.

3. A fuel injection controlling system according to claim 1, wherein said first multiplier circuit includes an adder having first and second sets of input terminals and a memory having the outputs thereof connected to said first set of input terminals of said adder, output terminals of said adder being connected to input terminals of said memory, and a predetermined binary coded signal being applied to said second set of input terminals of said adder as an input signal thereto, whereby during the time when said pulse signal from said first sensing means is on, said two input signals to said adder are added together each time said clock pulse from said oscillator circuit is applied thereto.

4. A fuel injection controlling system according to claim 3, wherein said second multiplier circuit includes another adder having first and second sets of input terminals and another memory having the output terminals thereof connected to said first set of input terminals of said another adder, output terminals of said another adder being connected to input terminals of said another memory, and the binary coded output signal of said first multiplier circuit being applied to said second set of input terminals of said another adder as an input signal thereto, whereby during the time when said pulse signal from said second sensing means is on, said two input signals to said another adder are added together each time said clock pulse from said oscillator circuit is applied thereto.

5. A fuel injection controlling system according to claim 3 further comprising an addition circuit for adding together a binary coded input signal corresponding to at least one auxiliary parameter of said engine and said predetermined binary coded input signal, whereby the binary coded output signal of said addition circuit is applied to said second set of input terminals of said adder in said first multiplier circuit.

* * * * *